United States Patent
Phadke et al.

(10) Patent No.: US 8,804,929 B2
(45) Date of Patent: Aug. 12, 2014

(54) SYSTEM AND METHOD FOR GENERATING SUBSCRIBER CHURN PREDICTIONS

(71) Applicants: Chitra A. Phadke, Basking Ridge, NJ (US); Huseyin Uzunalioglu, Millington, NJ (US); Veena B. Mendiratta, Oak Brook, IL (US); Dan Kushnir, Springfield, NJ (US); Derek Doran, Stratford, CT (US)

(72) Inventors: Chitra A. Phadke, Basking Ridge, NJ (US); Huseyin Uzunalioglu, Millington, NJ (US); Veena B. Mendiratta, Oak Brook, IL (US); Dan Kushnir, Springfield, NJ (US); Derek Doran, Stratford, CT (US)

(73) Assignee: Alcatel Lucent, Boulogne Billancourt (FR)

( * ) Notice: Subject to any disclaimer, the term of this patent is extended or adjusted under 35 U.S.C. 154(b) by 0 days.

(21) Appl. No.: 13/663,852

(22) Filed: Oct. 30, 2012

(65) Prior Publication Data

US 2014/0119522 A1    May 1, 2014

(51) Int. Cl.
    *H04M 15/00*    (2006.01)

(52) U.S. Cl.
    USPC ................. 379/112.01; 379/133

(58) Field of Classification Search
    USPC .............. 379/112.01, 126, 133; 705/7, 10
    See application file for complete search history.

(56) References Cited

U.S. PATENT DOCUMENTS

| | | | |
|---|---|---|---|
| 6,049,599 A * | 4/2000 | McCausland et al. | 379/111 |
| 2009/0192809 A1 * | 7/2009 | Chakraborty et al. | 705/1 |
| 2012/0231781 A1 * | 9/2012 | Kumar et al. | 455/422.1 |

FOREIGN PATENT DOCUMENTS

WO    WO 2011162662 A1 * 12/2011

* cited by examiner

*Primary Examiner* — Quoc D Tran
(74) *Attorney, Agent, or Firm* — McCormick, Paulding & Huber, LLP

(57) ABSTRACT

A system and method for generating a subscriber churn prediction includes receiving call detail records from a network operator detailing communication between subscribers of the network operator and determining tie-strengths between subscribers based on the call detail records. The system and method further includes generating a net churn influence accumulated at each subscriber from the tie-strengths by propagating churner influence between subscribers due to churn events.

15 Claims, 3 Drawing Sheets

SYSTEM AND METHOD FOR GENERATING SUBSCRIBER CHURN PREDICTIONS

FIELD OF THE INVENTION

The present invention relates to churn of network subscribers.

BACKGROUND OF THE INVENTION

Subscribers in mobile networks churn, i.e. unsubscribe from a network operator to switch to another network operator, for a variety of reasons. For example, subscribers may churn due to dissatisfaction with services offered by the network operator (e.g. voice service, data service, video service, short message service (SMS), multimedia message service (MMS) and the like), dissatisfaction with service quality, availability of mobile devices on the network, or the like. Subscribers may also decide to churn from the network operator due to financial considerations such as competitive pricing, discounts and/or promotions offered by another network operator.

SUMMARY

According to an embodiment, a system for generating a subscriber churn prediction comprises a data input device and at least one processor connected to the data input device. The data input device may receive call detail records from a network operator detailing communication for at least one subscriber of the network operator. The at least one processor may execute a churn prediction program to generate the subscriber churn prediction based at least on the call detail records.

According to an embodiment, the churn prediction program may include a social network analysis module that derives social metrics from the call detail records.

According to an embodiment, the churn prediction program may include a churn prediction module that receives the social metrics from the social network analysis module and generates the churn prediction.

According to an embodiment, the churn prediction is generated from the social metrics in combination with at least one traditional metric.

According to an embodiment, the social network analysis module may derive at least one social metric by determining tie-strengths between connected subscribers based on one or more calling attributes of the call detail records.

According to an embodiment, the at least one social metric may include at least one of a net churner influence, a number of neighboring subscribers that are churners, a number of hops to a nearest churner, a number of calls to churners, a number of calls to the nearest churner, and a time spent on calls to churners.

According to an embodiment, the social network analysis module may propagate a churner influence between subscribers based on the tie-strength and determine a net influence for each subscriber.

According to an embodiment, propagation of the churner influence may be receiver centric. The influence received by each subscriber from a connected subscriber may be proportional to the tie-strength of the tie between the subscribers.

According to an embodiment, a computerized method for generating a prediction of subscriber churn comprises the steps of receiving, by a churn prediction program executing on a computer processor, call detail records detailing communication for at least one subscriber of a network operator and generating, by the churn prediction program executing on the computer processor, a subscriber churn prediction based at least on the call detail records.

According to an embodiment, the computerized method may also comprise the step of deriving, by the churn prediction program executing on the computer processor, social metrics from the call detail records.

According to an embodiment, the step of generating, by the churn prediction program executing on the computer processor, the subscriber churn prediction may include combining the social metrics with at least one traditional metric for churn prediction.

According to an embodiment, deriving the social metrics may include determining, by the churn prediction program executing on the computer processor, tie-strengths between connected subscribers based on one or more calling attributes of the call detail records.

According to an embodiment, the social metrics may include at least one of a net churner influence, a number of neighboring subscribers that are churners, a number of hops to a nearest churner, a number of calls to churners, a number of calls to the nearest churner, and a time spent on calls to churners.

According to an embodiment, the computerized method may also comprise the step of propagating, by the churn prediction program executing on the computer processor, a churner influence between subscribers based on the tie-strength and determining a net influence for each subscriber.

According to an embodiment, propagating, by the churn prediction program executing on the computer processor, the churner influence between subscribers may be receiver centric. The influence received by each subscriber from a connected subscriber may be proportional to the tie-strength of the tie between the subscribers.

According to an embodiment, a non-transitory, tangible computer-readable medium storing instructions adapted to be executed by a computer processor to perform a method for generating a subscriber churn prediction may comprise the steps of receiving, by a churn prediction program executing on the computer processor, call detail records detailing communication for at least one subscriber of the network operator. The method may also comprise generating, by the churn prediction program executing on the computer processor, a subscriber churn prediction based at least on the call detail records.

According to an embodiment, the method may further comprise the step of deriving, by the churn prediction program executing on the computer processor, social metrics from the call detail records.

According to an embodiment, the step of generating, by the churn prediction program executing on the computer processor, the subscriber churn prediction may include combining the social metrics with at least one traditional metric for churn prediction.

According to an embodiment, deriving the social metrics may include determining, by the churn prediction program executing on the computer processor, tie-strengths between connected subscribers based on one or more calling attributes of the call detail records.

According to an embodiment, the method may further comprise the step of propagating, by the churn prediction program executing on the computer processor, a churner influence between subscribers based on the tie-strength and determining a net influence for each subscriber.

These and other embodiments of will become apparent in light of the following detailed description herein, with reference to the accompanying drawings.

DETAILED DESCRIPTION

Figure 1:
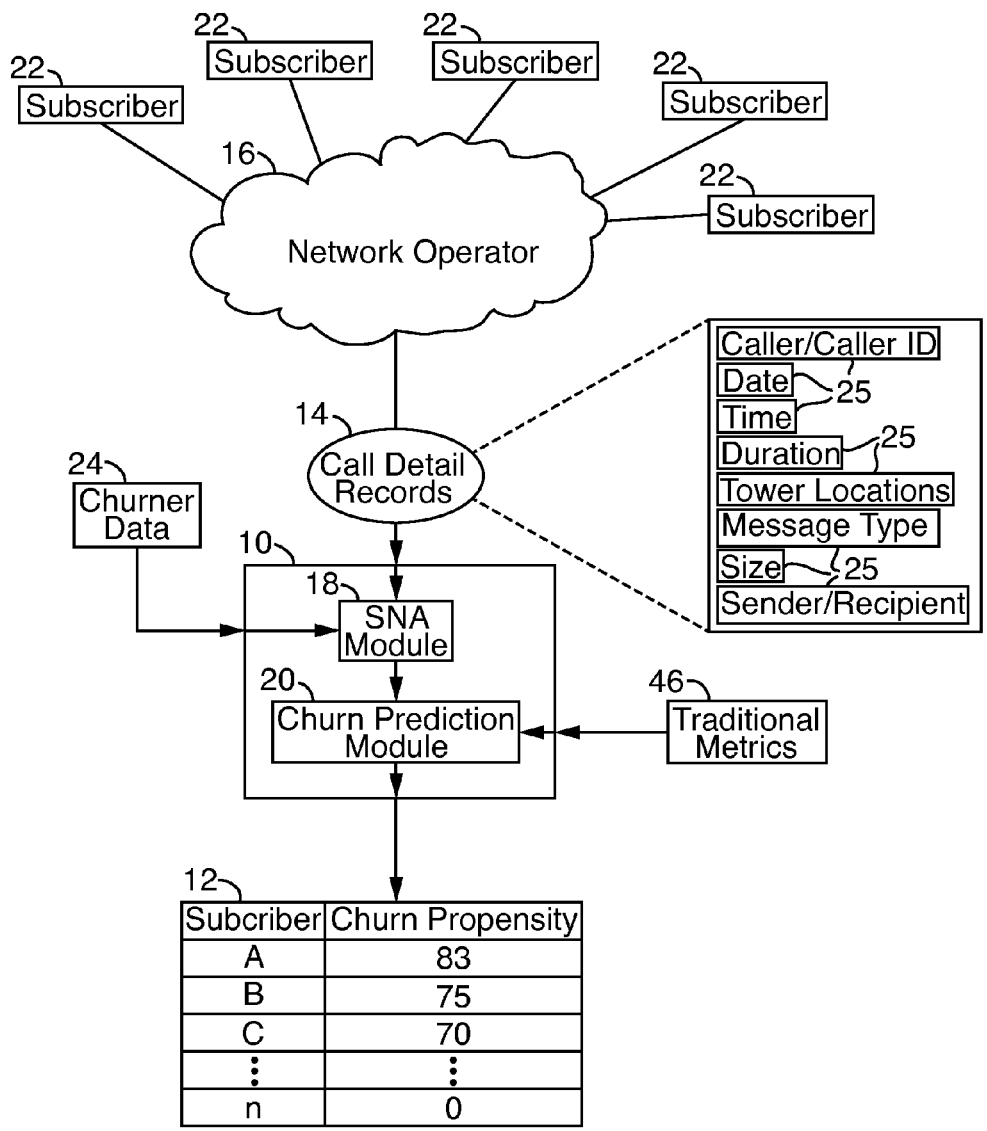
FIG. 1 is a schematic diagram of a computerized system according to an embodiment.

Referring to FIG. 1, an embodiment of a computerized system 10 adapted to generate a subscriber churn prediction 12 using call detail records 14 from a network operator 16 is shown. The computerized system 10 includes a social network analysis module 18 and a churn prediction module 20. The social network analysis module 18 uses the call detail records 14 to estimate social network connections between one or more subscribers 22 of the network operator 16. The computerized system 10 inputs churn data 24, which may be provided by the network operator 16, and the churn prediction module 20 generates the churn prediction 12 based, at least in part, on the churn data 24 and the estimated social network connections.

Each call detail record 14 includes one or more calling attributes 25 that detail a communication between one or more subscribers 22 of the network operator 16. These call detail records 14 are typically generated and used by the network operator 16 for billing purposes and the like. The calling attributes 25 of the call detail records 14 may include, for example, caller and callee identifiers, call date, call time, call duration, and the location of the cell towers for call initiation and termination among other details. The call detail records 14 may also include message sender and recipient identifiers, a message type (e.g. short message service (SMS) or multimedia message service (MMS)) and a message size.

Figure 2:
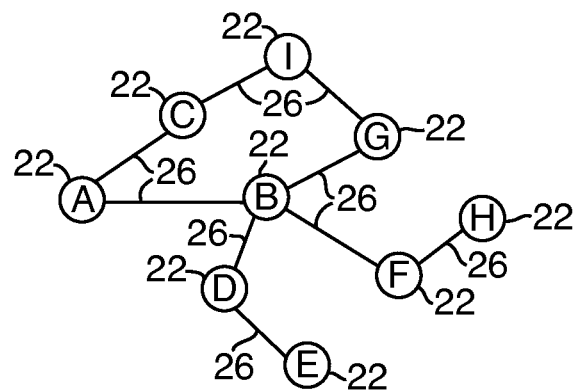
FIG. 2 is a graphical representation of subscriber connections formed by the computerized system of FIG. 1.

As discussed above, the social network analysis module 18 of the computerized system 10 may use the information provided in the call detail records 14 to estimate strengths of the social network connections between the one or more subscribers 22 of the network operator 16. For example, referring to FIG. 2, the social network analysis module 18, shown in FIG. 1, may generate tie-strengths 26 between the subscribers 22 based on the calling attributes 25, shown in FIG. 1, of the call detail records 14, shown in FIG. 1. Each tie-strength 26 quantifies the social connection between two subscribers 22 of the network operator 16, shown in FIG. 1, based on the communication information, i.e. the calling attributes 25, shown in FIG. 1, provided in the call detail record 14, shown in FIG. 1. For example, the tie-strength 26 between two subscribers 22 may be based on the number of calls/messages between the subscribers 22, the duration of the calls, the size of messages, a direction of the calls/messages (e.g. whether or not the calls/messages were reciprocal), a time to reciprocate calls/messages, the day/time of calls/messages, a number of common connections with other subscribers 22 and/or any other similar calling attributes 25, shown in FIG. 1, between the two subscribers 22. When generating the tie-strengths 26 between subscribers 22, the social network analysis module 18, shown in FIG. 1, preferably considers a plurality of the calling attributes 25 since there may be instances where one calling attribute 25, shown in FIG. 1, alone, may not provide a good indication of the social connection between two subscribers 22.

Figure 3:
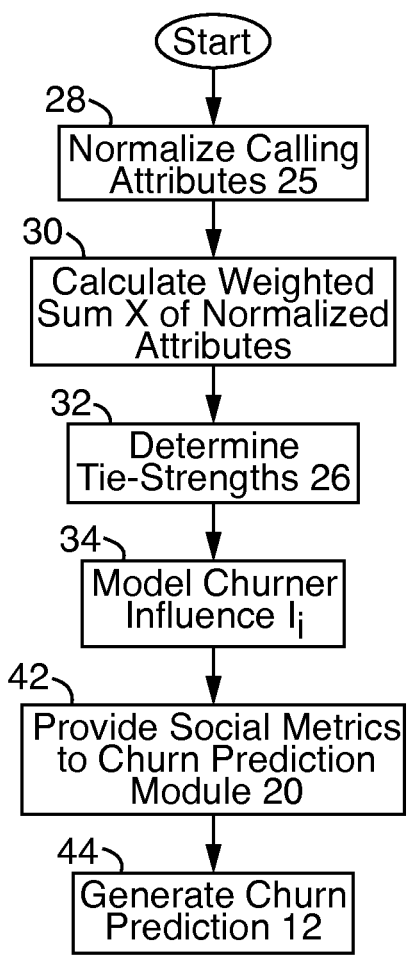
FIG. 3 is a flow diagram of an embodiment for generating churn predictions from the computerized system of FIG. 1.

Referring to FIG. 3, in operation, the social network analysis module 18, shown in FIG. 1, may generate the tie-strengths 26 between subscribers 22 by first normalizing the calling attributes 25 between each of the subscribers 22 at step 28. This allows the calling attributes 25, which are typically measured using different scales, to be combined by the social network analysis module 18, shown in FIG. 1, in a non-dimensional manner. For example, call duration may be measured in minutes while call frequency may be measured in calls per month. Thus, to make the calling attributes 25 more easily combinable, the social network analysis module 18 may normalize the calling attributes 25 by rescaling each calling attribute 25 to have a unit length. For example, in an embodiment, the social network analysis module 18, shown in FIG. 1, may normalize the calling attributes 25 by dividing each observation of an attribute $x_i$ by $|x_i|$, where:

$$|x_i| = \sqrt{\sum_{k=1}^{d} x_k^2}.$$

This operates to rescale each attribute $x_i$ to have a unit length. Once the calling attributes 25 have been normalized at step 28, the social network analysis module 18, shown in FIG. 1, may then calculate a weighted sum x of the normalized attributes $x_i$ between each of the subscribers 22 at step 30 to provide a measure of the total calling attributes 25 connecting any two subscribers 22. For example, the social network analysis module 18, shown in FIG. 1, may calculate the weighted sum x using the equation:

$$x = +\alpha_1 x_1 + \alpha_2 x_2 + \ldots + \alpha_n x_n;$$

where:

n is the number of calling attributes 25 being used to determine the tie-strengths 26; and $\alpha_1, \alpha_2, \ldots, \alpha_n$ are constants that may be derived, for example, from historical data or the like.

At step 32, the social network analysis module 18, shown in FIG. 1, may then calculate the tie-strengths 26 between subscribers 22 as a function w(x) of the weighted sums x of the normalized attributes $x_i$ between the subscribers 22. The function w(x) is preferably a monotonically increasing function so that tie-strengths 26 between subscribers 22 are greater for greater weighted sums x. For instance, in an exemplary embodiment, the social network analysis module 18, shown in FIG. 1, may determine the tie-strength 26 between two subscribers 22 using the monotonically increasing function w(x) given by:

$$w(x) = 1 - \exp(-x/\epsilon^2)$$

where:

w(x) is restricted to the interval [0,1]; and $\epsilon$ is a constant parameter controlling the rate of saturation that may also be derived, for example, from historical data or the like.

This exemplary function w(x) is based on the assumption that once a strong social connection is manifested between two subscribers 22, i.e. the tie-strength 26 is high, there is high probability that an idea, e.g. churning, will be transferred from one subscriber 22 to the other subscriber 22. However, as should be understood by those skilled in the art, this exemplary function w(x) is merely provided for illustrative purposes and those skilled in the art should readily understand that a variety of other functions may be appropriate for correlating the calling attributes 25 and determining the tie-strengths 26 between the subscribers 22.

Using the tie-strengths 26 and the churner data 24, shown in FIG. 1, the social network analysis module 18, shown in FIG. 1, determines the churner influence on the subscribers 22 at 34. The quantification of tie-strengths 26, as discussed above, provides a basis for measuring which subscribers 22 are closely connected to each other and, therefore, more likely to be influenced by each other's behaviors.

Figure 4:
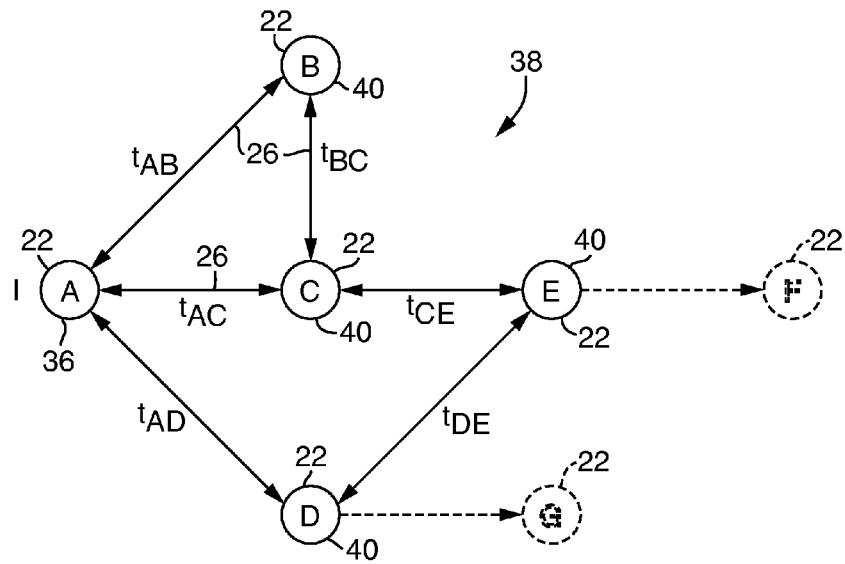
FIG. 4 is a graphical representation of an exemplary embodiment of a social circle formed by the computerized system of FIG. 1.

For example, referring to FIG. 4, the social network analysis module 18, shown in FIG. 1, may use the tie-strengths 26 to model propagation of influence I between subscribers 22 to quantify how influence I travels from a churner 36 to a social circle 38 of the churner 36 and what portion of the influence I is retained by recipients 40 of the influence I. To model the influence propagation through the social circle, the social network analysis module 18, shown in FIG. 1, considers the tie-strengths 26 between subscribers 22, denoted by nodes $n_A, n_B, n_C, n_D, \ldots$, etc. in the graph of FIG. 4. Between a particular node $n_i$ and an adjoining node $n_j$, the tie-strength 26 may be quantified as $t_{ij}$. For example, the tie-strength 26 between nodes $n_A$ and $n_B$ may be quantified as $t_{AB}$ and calculated as a function of the calling attributes 25, shown in FIG. 1, between subscriber nodes $n_A$ and $n_B$ using the monotonically increasing function w(x) discussed above. Since the calling attributes 25, shown in FIG. 1, between two subscribers 22 are undirectional between the subscribers 22, tie-strengths 26 are undirectional, i.e. $t_{ij}=t_{ji}$.

Once the tie-strengths 26 have been quantified, the social network analysis module 18, shown in FIG. 1, may determine the influence $I_{ij}$ received by node $n_i$ from node $n_j$ as a proportion of the tie-strength quantity $t_{ij}$ between the nodes $n_i$ and $n_j$ to the sum $T_i$ of the tie-strength quantities of all ties incident on node $n_i$ through the equation:

$$I_{ij} = \frac{t_{ij}}{T_i} I_j$$

where:

$I_j$ is the influence at node $n_j$;

$$T_i = \sum_{j \in S_i} t_{ij};$$

and $N_i$ is the set of all node neighbors of node $n_i$.

For example, still referring to FIG. 4, where node $n_A$ is a churner 36 having influence I, the influence received by node $n_B$ from node $n_A$ may be quantified as follows:

$$I_{BA} = \frac{t_{AB}}{t_{AB} + t_{BC}} I.$$

The total influence $I_i$ received by node $n_i$ is the sum of all of the influences received from all of the neighbors of node $n_i$ and given by the equation:

$$I_i = \sum_{j \in N_i} I_{ij}.$$

Thus, in keeping with the exemplary embodiment of FIG. 4, the total influence at node $n_B$ is $I_B = I_{BA} + I_{BC}$ since node $n_B$ will receive portions of the influence I from node $n_A$ in two ways, directly from node $n_A$ as $I_{BA}$ and indirectly through node $n_C$, which receives a portion of the influence I from node $n_A$ as $I_{CA}$. The amount of influence that node $n_B$ receives from nodes $n_A$ and $n_C$ is different because of the relative tie-strengths 26 between each of the nodes. Each of the receiving subscribers 22 will retain a portion of the influence received, pursuant to the equations discussed above, and then pass that retained influence on to neighboring subscribers 22. For example, subscriber node $n_E$ will receive a portion of the influence I of churn event of node $n_A$ via nodes $n_C$ and $n_D$. This propagation of influence I will continue until the retained influence reaches a negligible quantity, e.g. the retained influence approximates zero, or until a maximum pre-defined number of hops between subscribers 22 is reached. For example, the maximum pre-defined number of hops may be set to 3 or 4 hops between subscribers 22. In some embodiments, the social network analysis module 18, shown in FIG. 1, may also include a parameter for decaying the amount of influence propagated with the number of hops and/or with time. Additionally, in some embodiments, the social network analysis module 18, shown in FIG. 1, may consider a directionality of influence propagation with asymmetrical tie-strengths 26.

The social network analysis module 18, shown in FIG. 1, may also limit the propagation of influence I such that a particular subscriber 22 is not influenced by the same churn event from the same neighboring subscriber 22 more than once. Additionally, as should be understood by those skilled in the art, other limits and/or constraints for propagating the influence I may be set through the social network analysis module 18, shown in FIG. 1, when propagating the influence I through the social circle 38 depending upon the desired model of the social ties between subscribers 22.

The influence propagation calculation is repeated by the social network analysis module 18, shown in FIG. 1, for every churn event that occurs for the network operator 16, shown in FIG. 1. At the end of the propagation process, each of the subscribers 22 will have a net amount of influence $I_i$ gathered due to all of the churn events in the social circle 38.

The exemplary embodiment described above provides a receiver-centric model for influence propagation wherein the influence retained by the receiving subscriber 22 is advantageously dependent upon the relationship between the receiving subscriber 22 and the sending subscriber 22. For instance, if the receiving subscriber 22 is a close friend of the sending subscriber 22, the tie-strength 26 between the receiving subscriber 22 and the sending subscriber 22 will be larger than the tie-strengths with some other neighbors of the receiving subscriber 22, such as a colleague or an acquaintance. This larger tie-strength 26 will result in a larger influence at the receiving subscriber 22 from actions by the sending subscriber 22 than from actions of the other neighbors, e.g. the colleague or the acquaintance. The social network analysis module 18, shown in FIG. 1, is adapted to account for these social differences by quantifying the tie-strengths 26 between subscribers 22 so that the total amount of retained influence is relative to the tie-strength 26 that the receiving subscriber 22 has with the sending subscriber 22 in relation to the tie-strengths 26 with all his neighboring subscribers 22.

Referring back to FIG. 3, once the net amount of influence $I_i$ for each subscriber 22, shown in FIG. 4, has been determined, the social network analysis module 18, shown in FIG. 1, may provide socially relevant metrics for each subscriber 22, shown in FIG. 4, based on the social circle 38, shown in FIG. 4, to the churn prediction module 20 at step 42, as factors for determining the churn prediction 12. The socially relevant metrics for each subscriber 22, shown in FIG. 4, may include the net influence $I_i$, the number of neighboring nodes $n_i$ that are churners 36, shown in FIG. 4, the number of hops to the nearest churner 36, shown in FIG. 4, the number/volume of calls to churners 36, shown in FIG. 4, the number/volume of calls to the nearest churners 36, shown in FIG. 4, time spent on calls to churners 36, shown in FIG. 4, or other similar social data that may be derived from the social circle 38, shown in FIG. 4, and the call detail records 14, shown in FIG. 1.

Additionally, in some embodiments, the social network analysis module 18, shown in FIG. 1, may mine text from social media websites to glean information about the sentiments that subscribers 22 have toward their network operator 16, shown in FIG. 1. The social network analysis module 18, shown in FIG. 1, may use this information linking each subscriber 22 to their social identity on the social websites as a further social metric for generating the churn prediction 12.

At 44, the churn prediction module 20 generates the churn prediction 12 based on the socially relevant metrics provided by the social network analysis module 18, shown in FIG. 1, in addition to traditional subscriber-level metrics 46, shown in FIG. 1. The traditional subscriber-level metrics 46, shown in FIG. 1, may include, for example, service usage, billing, customer relationship management data (e.g., calls to customer support, outcome of complaints, demographic data and the like). To generate the churn prediction 12, the churn prediction module 20 may incorporate the socially relevant metrics provided by the social network analysis module 18, shown in FIG. 1, and any traditional subscriber-level metrics 46, shown in FIG. 1, as predictive variables in a traditional machine-learning algorithm or process for predicting customer churn. For example, a number of different classification algorithms and processes such as logistic regression, decision trees, and random forests may be used for classifying the subscribers 22 as potential churners. The classification process of the churn prediction module 20 may start with a training data set, where the value of the target variable is known for the subscribers 22, i.e., whether or not the each subscriber is a churner 36, shown in FIG. 4. The processes may use the training data to evaluate the relationship between the predictive. Then, the churn prediction module 20 may use the learned model to input and evaluate the predictive variables to generate the churn prediction 12 indicating whether or not particular subscribers have a higher or lower propensity to churn.

The churn prediction 12 may indicate a probability that each subscriber 22 will churn, rather than just labeling each subscriber 22 as a potential churner or non-churner, so that subscribers 22 may be ordered from high to low churn likelihood or propensity. With such ordering, the network operator 16 may advantageously develop a retention campaign to target a limited number of subscribers 22 having the highest likelihood or propensity to churn.

Figure 5:
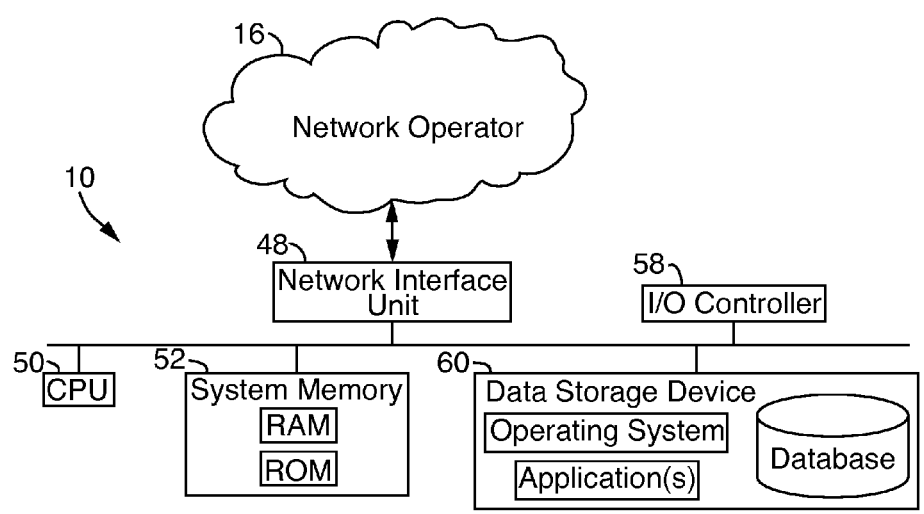
FIG. 5 is a schematic diagram of an exemplary embodiment of the computerized system of FIG. 1.

The computerized system 10, shown in FIG. 1, described herein has the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, referring to FIG. 5, an exemplary embodiment of the computerized system 10 is shown connected to the network operator 16 through a network interface unit 48. The computerized system 10 may include at least one central processing unit (CPU) 50, system memory 52, including random access memory (RAM) 54 and read-only memory (ROM) 56, an input/output controller 58, and one or more data storage devices 60. All of these latter elements are in communication with the CPU 50 to facilitate the operation of the computerized system 10 as discussed above. Suitable computer program code may be provided for executing numerous functions, including those discussed above in connection with the social network analysis module 18 and churn prediction module 20, both shown in FIG. 1. The computer program code may also include program elements such as an operating system, a database management system and "device drivers" that allow the CPU 50 to interface with computer peripheral devices (e.g., a video display, a keyboard, a computer mouse, etc.) via the input/output controller 58.

The CPU 50 may comprise a processor, such as one or more conventional microprocessors and one or more supplementary co-processors such as math co-processors or the like. The CPU 50 is in communication with the network interface unit 48, through which the CPU 50 may communicate with the network operator 16 and/or other devices such as other servers or user terminals. The network interface unit 48 may include multiple communication channels for simultaneous communication with, for example, other processors, servers or operators. Devices in communication with each other need not be continually transmitting to each other. On the contrary, such devices need only transmit to each other as necessary, may actually refrain from exchanging data most of the time, and may require several steps to be performed to establish a communication link between the devices.

The CPU 50 is in communication with the data storage device 60. The data storage device 60 may comprise an appropriate combination of magnetic, optical and/or semiconductor memory, and may include, for example, RAM, ROM, flash drive, an optical disc such as a compact disc and/or a hard disk or drive. The CPU 50 and the data storage device 60 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing. For example, the CPU 50 may be connected to the data storage device 60 via the network interface unit 48.

The data storage device 60 may store, for example, one or more databases adapted to store information that may be utilized to store information required by the program, an operating system for the computerized system 10, and/or one or more programs (e.g., computer program code and/or a computer program product) adapted to direct the CPU 50 to generate churn predictions 12, shown in FIG. 1. The operating system and/or programs may be stored, for example, in a compressed, an uncompiled and/or an encrypted format, and may include computer program code. The instructions of the computer program code may be read into a main memory of the processor from a computer-readable medium other than the data storage device 60, such as from the ROM 56 or from the RAM 54. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

The program may also be implemented in programmable hardware devices such as field programmable gate arrays, programmable array logic, programmable logic devices or the like. Programs may also be implemented in software for execution by various types of computer processors. A program of executable code may, for instance, comprise one or more physical or logical blocks of computer instructions, which may, for instance, be organized as an object, procedure, process or function. Nevertheless, the executables of an identified program need not be physically located together, but may comprise separate instructions stored in different locations which, when joined logically together, comprise the program and achieve the stated purpose for the programs such as generating churn predictions 12, shown in FIG. 1. In an embodiment, an application of executable code may be a compilation of many instructions, and may even be distributed over several different code partitions or segments, among different programs, and across several devices.

The term "computer-readable medium" as used herein refers to any medium that provides or participates in providing instructions to the CPU 50 of the computerized system 10 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to the CPU 50 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the CPU 50. The system bus carries the data to main memory, from which the CPU 50 retrieves and executes the instructions. The instructions received by main memory may optionally be stored in memory either before or after execution by the CPU 50. In addition, instructions may be received via a communication port as electrical, electromagnetic or optical signals, which are exemplary forms of wireless communications or data streams that carry various types of information.

The computerized system 10 advantageously provides a system and method to predict customer churn in telecommunication services that integrates social network analysis concepts with traditional churn prediction systems and methods in an effort to detect potential churners before they unsubscribe from network operators. The tie-strengths 26, shown in FIG. 4, and the influence propagation model developed by the social network analysis module 18, shown in FIG. 1, may beneficially be integrated into the machine-learning based churn prediction module 20, shown in FIG. 1, to improve churn prediction accuracy. Once potential churners are identified, they may then be targeted with retention campaigns and the like.

Additionally, the system and method of the computerized system 10 may advantageously be applied to model influence diffusion for a variety of social phenomenon that may influence a subscriber 22, shown in FIG. 1, such as up-selling of services, cross-selling of services and downloading of applications. For example, the social network analysis module 18, shown in FIG. 1, may be implemented to better target current subscribers 22, shown in FIG. 1, for new services and/or applications.

Although this invention has been shown and described with respect to the detailed embodiments thereof, it will be understood by those skilled in the art that various changes in form and detail thereof may be made without departing from the spirit and the scope of the invention.

What is claimed is:

1. A system for generating a subscriber churn prediction comprising:
    a data input device adapted to receive call detail records from a network operator detailing communication for at least one subscriber of the network operator; and
    at least one processor connected to the data input device, the at least one processor adapted to execute a churn prediction program that determines tie-strengths between connected subscribers of the network operator based on a weighted sum of a plurality of normalized call attributes from the call detail records and derives at least one social metric with the tie-strengths;
    wherein the churn prediction program generates the subscriber churn prediction based at least on the at least one social metric.

2. The system according to claim 1, wherein the churn prediction program includes a social network analysis module that determines the tie-strengths and derives social metrics from the call detail records for generating the churn prediction.

3. The system according to claim 2, wherein the churn prediction program includes a churn prediction module that receives the social metrics from the social network analysis module and generates the churn prediction.

4. The system according to claim 3, wherein the churn prediction is generated from the social metrics in combination with at least one of a service usage metric, a billing metric, a number of calls to customer support, an outcome of complaints or a demographic data.

5. The system according to claim 1, wherein the at least one social metric includes at least one of a net churner influence, a number of neighboring subscribers that are churners, a number of hops to a nearest churner, a number of calls to churners, a number of calls to the nearest churner, and a time spent on calls to churners.

6. The system according to claim 1, wherein the social network analysis module propagates a churner influence between subscribers based on the tie-strength and determines a net influence for each subscriber.

7. The system according to claim 6, wherein the propagation of the churner influence is receiver centric with the influence received by each subscriber from a connected subscriber being proportional to the tie-strength of the tie between the subscribers.

8. A computerized method for generating a prediction of subscriber churn comprising the steps of:
    receiving, by a churn prediction program executing on a computer processor, call detail records from a network operator detailing communication for at least one subscriber of the network operator;

determining, by the churn prediction program executing on the computer processor, tie-strengths between connected subscribers on the network operator based on a weighted sum of a plurality of normalized call attributes from the call detail records;

deriving, by the churn prediction program executing on the computer processor, at least one social metric with the tie-strengths; and generating, by the churn prediction program executing on the computer processor, a subscriber churn prediction based at least on the at least one social metric.

9. The computerized method according to claim 8, wherein the step of generating, by the churn prediction program executing on the computer processor, the subscriber churn prediction includes combining the social metrics with at least one of a service usage metric, a billing metric, a number of calls to customer support, an outcome of complaints or a demographic data.

10. The computerized method according to claim 8, wherein the at least one social metric includes at least one of a net churner influence, a number of neighboring subscribers that are churners, a number of hops to a nearest churner, a number of calls to churners, a number of calls to the nearest churner, and a time spent on calls to churners.

11. The computerized method according to claim 8, additionally comprising the step of:

propagating, by the churn prediction program executing on the computer processor, a churner influence between subscribers based on the tie-strength and determining a net influence for each subscriber.

12. The computerized method according to claim 11, wherein propagating, by the churn prediction program executing on the computer processor, the churner influence between subscribers is receiver centric with the influence received by each subscriber from a connected subscriber being proportional to the tie-strength of the tie between the subscribers.

13. A non-transitory, tangible computer-readable medium storing instructions adapted to be executed by a computer processor to perform a method for generating a subscriber churn prediction, said method comprising the steps of:

receiving, by a churn prediction program executing on the computer processor, call detail records from a network operator detailing communication for at least one subscriber of the network operator;

determining, by the churn prediction program executing on the computer processor, tie-strengths between connected subscribers on the network operator based on a weighted sum of a plurality of normalized call attributes from the call detail records;

deriving, by the churn prediction program executing on the computer processor, at least one social metric with the tie-strengths; and generating, by the churn prediction program executing on the computer processor, a subscriber churn prediction based at least on the at least one social metric.

14. The non-transitory, tangible computer-readable medium of claim 13, wherein the step of generating, by the churn prediction program executing on the computer processor, the subscriber churn prediction includes combining the social metrics with at least one of a service usage metric, a billing metric, a number of calls to customer support, an outcome of complaints or a demographic data.

15. The non-transitory, tangible computer-readable medium of claim 13, wherein the method further comprises the step of:

propagating, by the churn prediction program executing on the computer processor, a churner influence between subscribers based on the tie-strength and determining a net influence for each subscriber.

* * * * *